No. 731,599. PATENTED JUNE 23, 1903.
J. McGRAW, Jr.
LOCK WASHER.
APPLICATION FILED JULY 25, 1902.
NO MODEL.
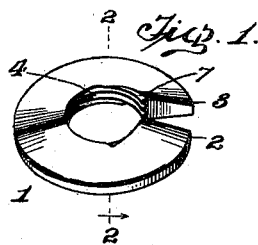
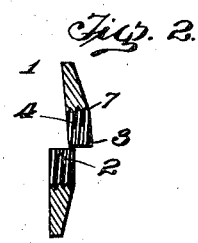
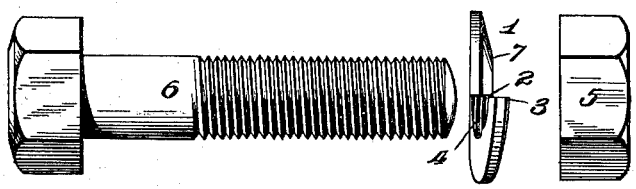
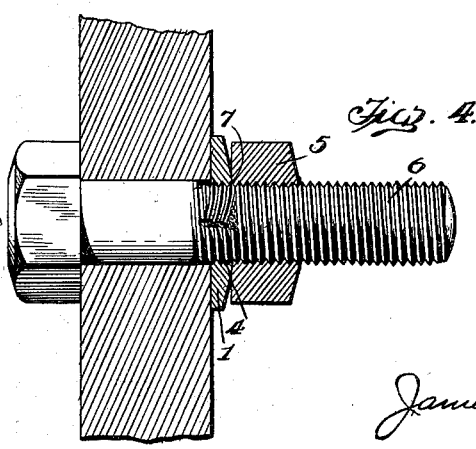
Witnesses
L. G. Handy
Edgar M. Kitchin
Inventor
James McGraw Jr.
By Mason, Fenwick & Lawrence
Attorneys No. 731,599. Patented June 23, 1903.

UNITED STATES PATENT OFFICE.

JAMES McGRAW, JR., OF RICHMOND, VIRGINIA.

LOCK-WASHER.

SPECIFICATION forming part of Letters Patent No. 731,599, dated June 23, 1903.

Application filed July 25, 1902. Serial No. 116,920. (No model.)

*To all whom it may concern:*

Be it known that I, JAMES McGRAW, Jr., a citizen of the United States, residing at Richmond, in the county of Henrico and State of Virginia, have invented certain new and useful Improvements in Lock-Washers; and I do hereby declare the following to be a full, clear, and exact description of the invention, such as will enable others skilled in the art to which it appertains to make and use the same.

My invention relates to improvements in lock-washers; and it consists of such a helical-shaped washer constructed of tempered spring-steel and tapped and left open or split at it ends, the washer being tapered from an inside edge to its outside edge.

It also consists of such a washer in combination with a bolt of ordinary construction and a nut of common construction, the nut being forced down upon the washer with sufficient force to bring the spread and separated ends thereof toward each other, which act causes the threads of the lock-washer to break or cut the threads on the bolt and cross-threads with it, and thus cause a positive lock, the inside sharp edge of the washer also cutting into the nut, locking same on the bolt, thereby causing a lock on both washer and nut.

It also consists of a washer made of tempered spring-steel and bent in the form of a spiral and split so as to have one of its ends projected above the other, the said washer being tapped or threaded in its bore or eye.

The invention also consists of such a lock-washer applied to a threaded bolt and a jam-nut applied to the bolt on top of the washer and forced down, so as to cause the upwardly-projecting end to be brought substantially into the same plane as the other end of said washer, by which act the threads of the bolt are stripped or cut and the threads become crossed with the threads on the lock-washer, and thus cause a positive lock.

In the accompanying drawings, Figure 1 is a perspective view of my improved lock-washer. Fig. 2 is a vertical transverse section through the same on the line 2 2 of Fig.
1. Fig. 3 is a view showing a bolt and nut of ordinary construction and my improved lock-washer in a separated position, and Fig. 4 is a vertical longitudinal section through a bolt and nut with my improved lock-washer in position on the bolt and the nut jammed or forced down upon the same.

The object of my invention is the production of a lock-washer which will be practically impossible to loosen or come off of the bolt and which will lock both the washer and nut, though in some instances it will not be necessary for the washer to engage or bite into both the bolt and nut, it being sufficient under some conditions to cut into and cross the threads of the bolt only. In order to render the invention effective, I have found that the lock-washer must be made of steel and tempered, so as to readily strip or cut the threads on the bolt, which latter is of a less hardness than said washer.

In carrying out my invention I employ a strip of tempered spring-steel and form the same into a split washer, which on its exterior may be finished square, round, hexagon, or in any other suitable shape. The steel strip from which the washer is formed is preferably tapering in cross-section—that is, from its inside to its outside edge—and this is the preferred construction, though for some purposes and under certain conditions it may be made flat in cross-section. The washer when formed will be helical in shape, the ends being left open or separated, as at 2 3, and the washer tapped, as at 4, with the full standard thread, after which it is tempered to a hard temper. By constructing the washer with a taper from its inside to its outside edge an important function is secured—namely, when the jam-nut 5 is screwed down upon the bolt 6 with unusual force the sharp edge 7 at the upper edge of the bore of the washer will be forced into and caused to bite into the material of the nut 5, which latter is of less hardness than the washer, and prevent the nut from coming off of the bolt. At the same time by crowding or jamming the nut 5 down upon the washer 1 the projecting end 3 will be forced down substantially into the same plane with the end 2, which act will cut or strip the threads on the bolt and cause the threads of the washer to become crossed with the threads on the bolt, rendering it practically impossible for the washer to become disengaged from the bolt.

The invention being simple in its construction and operation can be produced at slight cost and being practical in its operation when applied in connection with a bolt and nut will be found of great utility.

Having now described my invention, what I claim as new, and desire to secure by Letters Patent, is—

1. A lock-washer comprising in its construction a body portion of helical shape and constructed of spring material, said body portion being tapered in cross-section from its inner to its outer edge, a threaded aperture formed in said body portion, the construction being such that a cutting edge is formed at the upper portion of the threaded aperture, substantially as described.

2. In a nut-lock, the combination with a bolt formed with suitable threads and designed to be passed through a rail and a nut threaded onto said bolt, of a lock-washer of helical shape threaded onto said bolt between said nut and said rail, and designed to be flattened by the pressure of said nut against one face thereof, whereby a portion of the threads of said bolt will be stripped, substantially as described.

3. In a nut-lock the combination with a rail a bolt passed therethrough and threaded for a portion of its length, of a helical-shaped spring-steel washer threaded upon said bolt and provided with a flat inner face designed to lie flush with the side of the rail for a portion of its distance, the remaining portion thereof springing outwardly from said rail, the outer face of said washer being beveled, and a nut threaded upon said bolt and designed to contact with said beveled outer face for moving said outwardly-springing portion toward said rail, thereby stripping a portion of the threads of said bolt, substantially as described.

In testimony whereof I hereunto affix my signature in presence of two witnesses.

JAMES McGRAW, Jr.

Witnesses:
R. N. WALL,
CHAS. D. ALLEN.